United States Patent [19]

Butterfield et al.

[11] Patent Number: 4,471,672

[45] Date of Patent: Sep. 18, 1984

[54] MOTION TRANSMITTING SYSTEM

[75] Inventors: Roger P. Butterfield, Interlaken; Charles M. Allaben, Jr., Ithaca, both of N.Y.

[73] Assignee: Emerson Electric Co., St. Louis, Mo.

[21] Appl. No.: 322,615

[22] Filed: Nov. 18, 1981

[51] Int. Cl.³ .................. F16H 1/28; F16D 63/00
[52] U.S. Cl. .................. 74/804; 188/82.84
[58] Field of Search ............. 74/804, 805, 801, 802, 74/803; 192/8 R; 188/82.84

[56] References Cited

U.S. PATENT DOCUMENTS

| | | | |
|---|---|---|---|
| 1,694,031 | 12/1928 | Braren | 74/804 |
| 2,170,951 | 8/1939 | Perry | 74/804 |
| 3,019,594 | 2/1962 | Sundt | 74/804 |
| 3,979,167 | 9/1976 | Grove | 74/805 X |
| 4,023,440 | 5/1981 | Kennington et al. | 74/804 |
| 4,050,331 | 9/1977 | Braren | 74/804 |
| 4,117,746 | 10/1978 | Pierrat | 74/804 X |
| 4,177,695 | 12/1979 | Grove | 74/804 |
| 4,194,415 | 3/1980 | Kennington et al. | 74/805 |
| 4,282,777 | 8/1981 | Ryffel et al. | 74/804 |
| 4,297,920 | 11/1981 | Richter | 74/804 |

FOREIGN PATENT DOCUMENTS

| | | | |
|---|---|---|---|
| 459025 | 4/1928 | Fed. Rep. of Germany | 74/804 |
| 973323 | 2/1951 | France | 74/804 |

*Primary Examiner*—Allan D. Herrmann
*Assistant Examiner*—Stephen B. Andrews
*Attorney, Agent, or Firm*—Polster, Polster and Lucchesi

[57] ABSTRACT

A motion transmitting device having an input shaft and a concentric output shaft assembly, and an eccentrically rotated gear driven by the input shaft to provide an eccentric output. The gear has teeth which engage and subsequently disengage with independently movable meshing elements, such as pins. A pair of datum members have round holes to individually guide and limit movement of the meshing elements within predetermined limits of orbital motion relative to the datum members. The eccentric output drive of the gear is converted to rotary motion of the output shaft assembly. The input shaft and the output shaft assembly are rotatable about a common axis.

2 Claims, 7 Drawing Figures

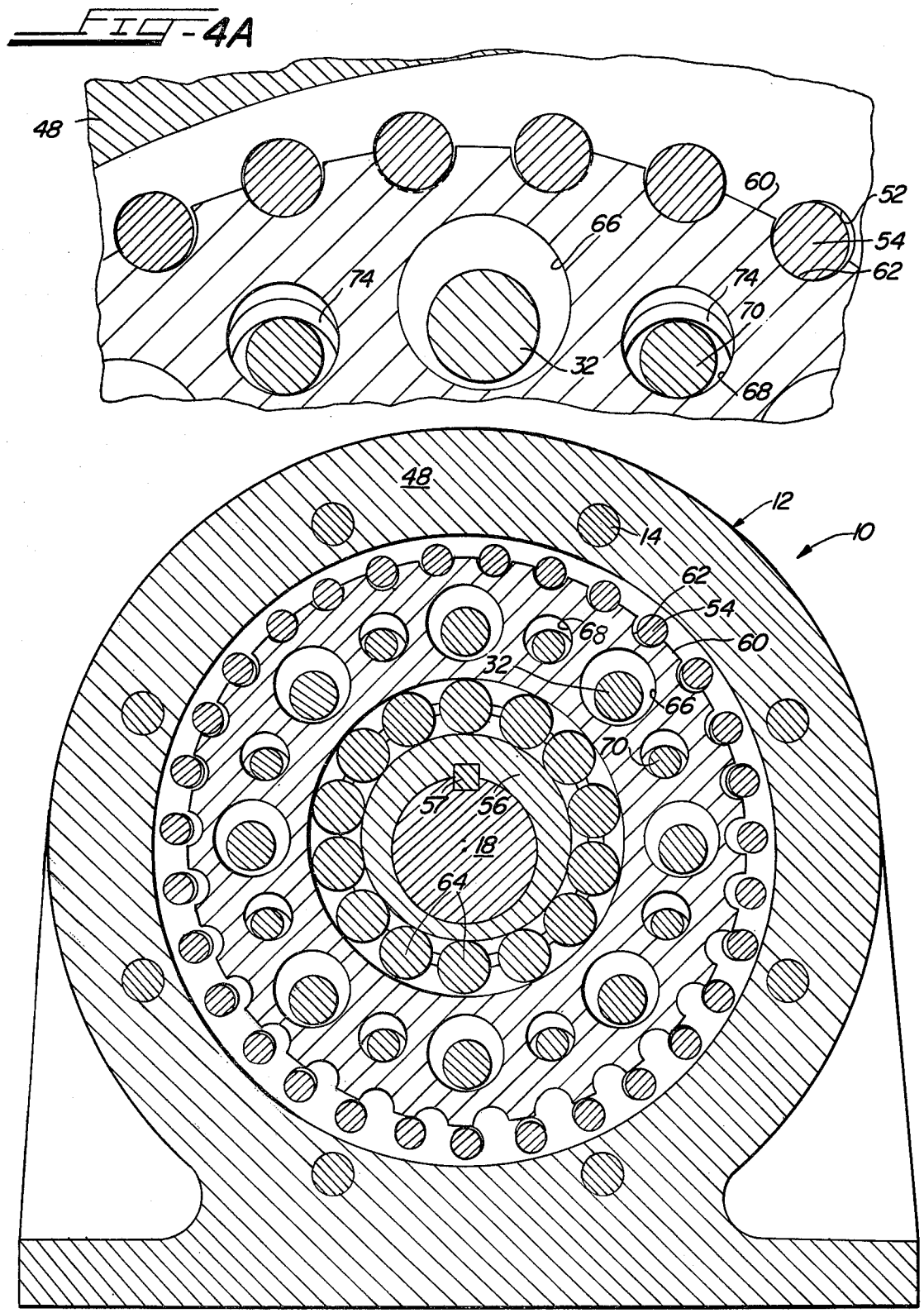

4,471,672

MOTION TRANSMITTING SYSTEM

BACKGROUND OF THE INVENTION

Motion transmitting and speed changing devices having an input member and an output member, the latter being driven by a gear means through a coupling which transforms eccentric motion to rotary motion and the former driving the gear means through and eccentric, are known in the art. Examples of motion transmitting devices in which the gear means meshes with meshing elements having limited movement are illustrated in U.S. Pat. Nos. 4,023,440 and 4,194,415 granted May 17, 1977, and Mar. 25, 1980, respectively. These drives are known as "Quadrant Drives" becauses the driving engagement of the gear means and the meshing elements is substantially through an arc of 90°. In these patents, the meshing elements are linked together, and ovoid holes in one or more datum members or capturing plates flanking the gear means comprise the movement limiting means. Drives of the type described generally use an Oldham coupling to convert the eccentric output to the rotary motion.

A suggestion has been made in a motion transmitting device to support an output shaft in bearings disposed in a cup-like portion of an input shaft which is in turn journalled in a bearing supported by the housing, the output shaft being driven by a coupling which includes a generally circular disc-like rotor attached to the output shaft, and driven by pins extending from a rotor member in turn driven by an eccentric gear which provides a reduction drive.

SUMMARY OF THE INVENTION

The invention herein described relates to a motion transmitting device or speed changing device similar in some respects to the "Quadrant Drives". However, the need for a coupling to convert eccentric motion to rotary motion, such as an Oldham coupling, is eliminated. A more compact motion transmitting device is provided, described as a "close-coupled" drive. In the drive system of this invention, the input shaft and output shaft are coaxial, and in the preferred embodiment, the input and output shaft assembly are concentric about a common axis and are generally co-planar. The output shaft assembly surrounds the input shaft, at least in part. The input shaft is journalled in bearings at two locations in the output shaft assembly. Because of the construction of the output shaft assembly, it too, is journalled in a pair of spaced bearings supported by the housing.

The drive system of this invention comprises a gear driven from an eccentric on the input shaft with its teeth meshing with independently movable meshing elements. Movement limiting means limit motion of the meshing elements, the limiting means being openings or holes in at least one datum member of capturing plate flanking the gear. The motion limiting means, i.e., the openings or holes in the datum members, according to one aspect of this invention, are round instead of ovoid, and the gear is formed with semi-circular tooth spaces to mesh with the meshing elements. Round holes in the datum members are easily formed and do not require precision manufacturing techniques as required for the forming of ovoid holes as taught by the prior art patents noted above. The system of this invention is so constructed that the motion of the meshing elements relative to the motion limiting means is substantially pure rolling motion. With rolling motion, frictional losses are minimized.

In the preferred embodiment, the gear is disposed between two datum members having aligned opposite openings for the meshing elements. The datum members or capturing plates are fixedly attached to a housing for the drive system. To achieve a difference in speeds of the output and input shafts, the drive system is provided with at least one more meshing element than there are gear teeth.

The coupling arrangement of this invention utilizes an output shaft assembly driven by the eccentric, and is usable with generally any drive mechanism having a single eccentrically driven member and an output shaft, as for example, those drives in which the teeth of an eccentric sprocket mesh with the teeth of an internal gear.

BRIEF DESCRIPTION OF THE DRAWINGS

FIG. 4 is a sectional view taken on line 4—4 of FIG. 3; and

FIG. 4A is a partial sectional view, depicting a portion of FIG. 4, and enlarged to show details.

DESCRIPTION OF THE PREFERRED EMBODIMENT

Figure 1:
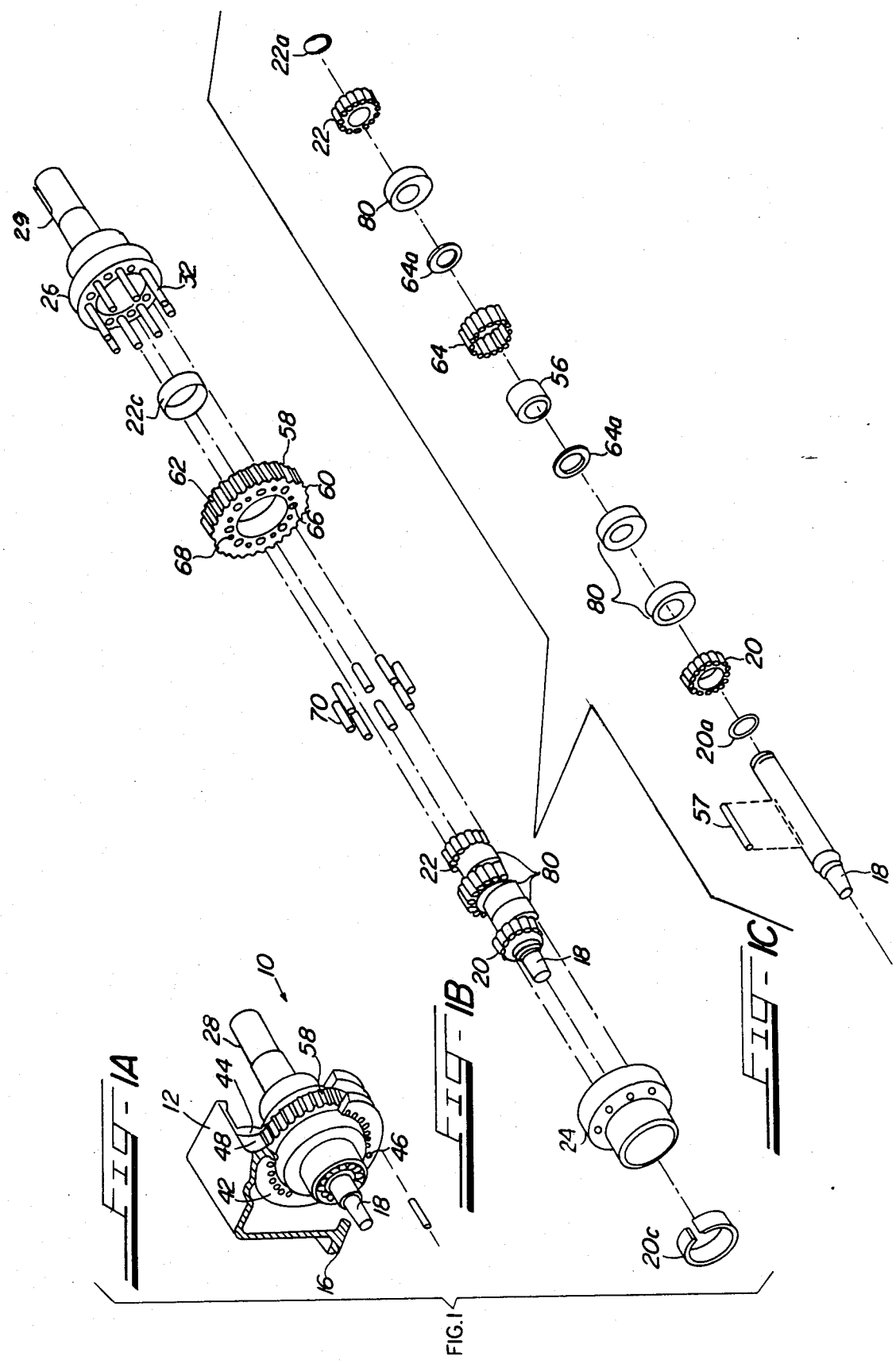
FIG. 1A is a perspective view, partially broken away, illustrating a part of the housing, datum members and drive assembly of this invention.
FIG. 1B is an exploded, perspective view, illustrating the major parts of the drive assembly.
FIG. 1C is another exploded, perspective view illustrating other portions of the drive assembly.
Figure 2:
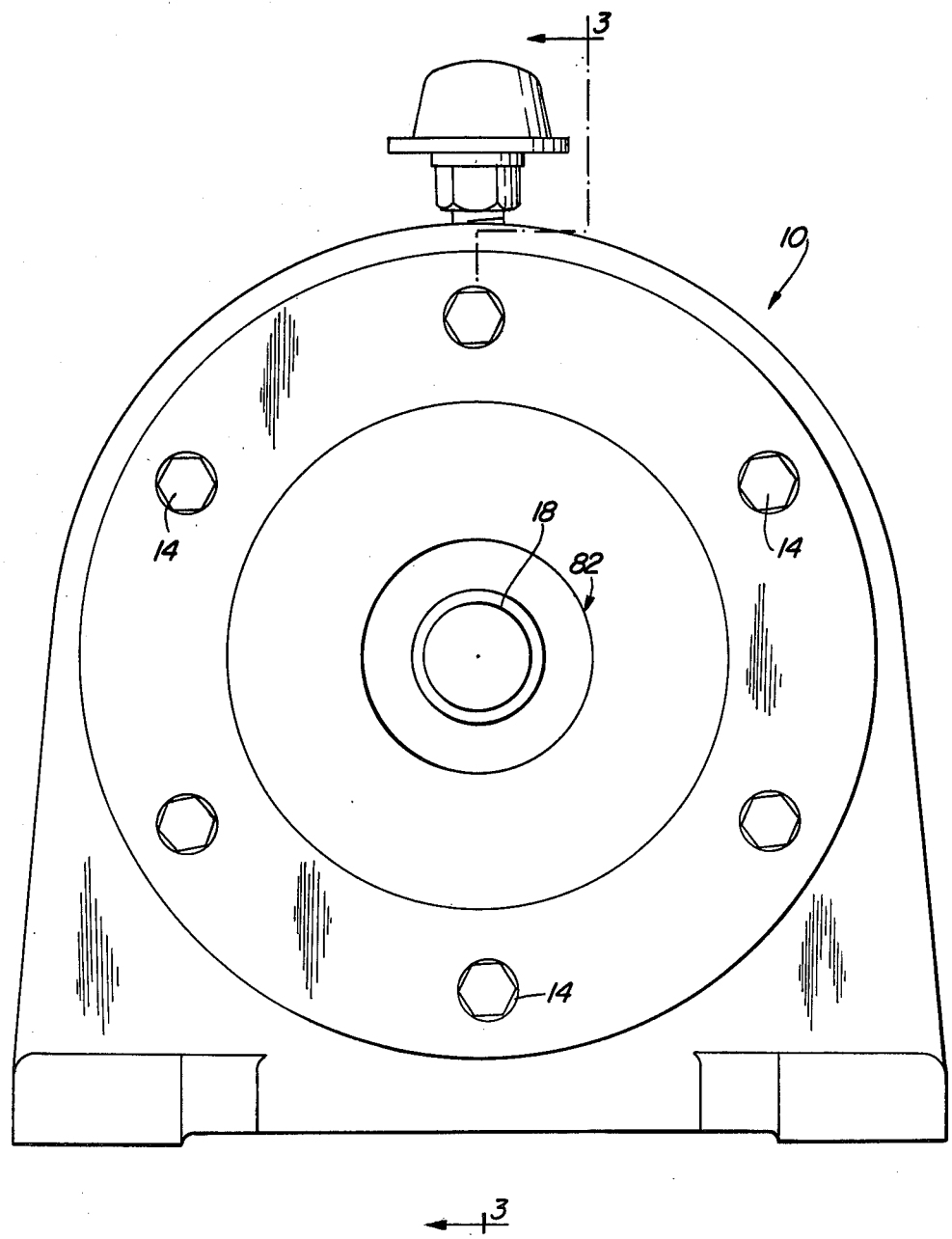
FIG. 2 is an end view of the motion transmitting system of this invention.
Figure 3:
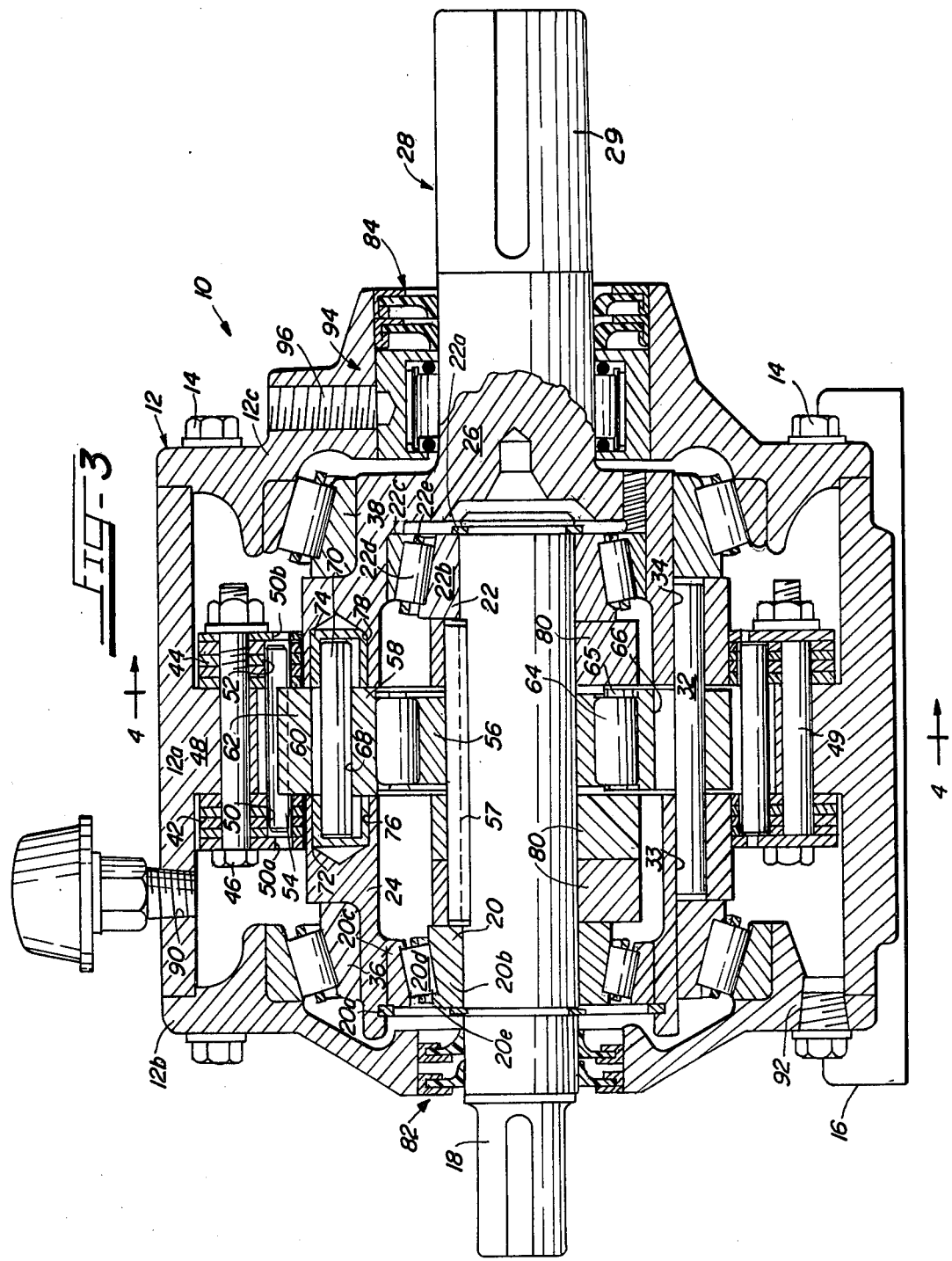
FIG. 3 is a longitudinal sectional view, taken on line 3—3 of FIG. 2, of the inventive system.

The general path of rotary motion transmission from input to output will first be described in connection with FIGS. 1B and 3. The motion transmitting system of the invention includes a rotatable input member 18, on which an eccentric 56 is fastened. A gear 58 is mounted on eccentric 56, so that gear 58 is eccentrically rotated as input member 18 is rotated. An output shaft assembly 28 includes two sections or subassemblies 24 and 26, and an output shaft extension 29. A plurality of coupling pins 70 extend through correspondingly shaped holes 68 of gear 58, and into suitably bored portions of sleeve section 24 and cup-like section 26 of the output shaft assembly. Accordingly, it is apparent that output shaft member 29 is rotated as input shaft 18 is driven, over the path including eccentric 56, gear 58, coupling pins 70, sections 24 and 26 of output shaft assembly 28, and output shaft 29 of the same assembly. With this summary of motion transmission, a detailed mechanical description and teaching of the speed modification through the system will now be set out.

In more detail, the motion transmitting device or drive system illustrated in the drawings and identified as 10, comprises end covers 12b and 12c (FIG. 3), the parts of which are connected by one or more machine bolts 14. The center section 12a is provided with a base 16 for fixing the device to a support.

Input shaft 18 is journalled for rotation in spaced bearing assemblies being 20 and 22, the bearing assemblies supported in parts or sections 24 and 26 of output shaft assembly 28 which also includes output shaft member 29. Of the two parts, one is a sleeve-like part 24 and the other is a cup-like part 26; these parts or sections are rotatably joined by one or more connecting rods 32 press fitted in openings 33 and 34 in the shaft parts 26 and 24, respectively. The bearing assembly 20 is suitably secured on input shaft 18 by a snap ring 20a. Bearing 20 comprises an inner race 20b, an outer race 20c and a plurality of tapered rollers 20d, the latter being spaced apart by a cage 20e. The bearing assembly 22 is located on the shaft 18 by a snap ring 22a. Assembly 22 comprises an inner race 22b, an outer race 22c, and a plurality of tapered rollers 22d, the latter being spaced by a cage 22e. The subassemblies 24 and 26 which support the input shaft are journalled in bearing assemblies 36 and 38, respectively, supported in the housing 12. The bearing assemblies 36 and 38, because of the relationship of the input and output shafts, also support the input shaft. Each bearing assembly comprises an inner and outer race with a plurality of rollers therebetween, the rollers being spaced by a cage. The bearing assemblies 20, 22, 36, and 38 are shown as being of the tapered roller variety, it being understood that other types of bearings can be used if necessary or desirable. It is to be noted that input shaft and the output shaft assembly 28 are coaxial, concentric and, in the preferred embodiment, the output shaft assembly surrounds at least a part of the input shaft within the housing.

A pair of spaced, ring-like datum members or capturing plates 42 and 44 are held in the housing 12 by bolts 46, being spaced by a ring-like datum spacer portion 48 of the housing part 12a. One or more locating pins 49 insure the proper location of the datum members in the housing. The datum members 42 and 44 are provided with a plurality of evenly spaced motion limiting means in the form of round openings or holes 50, 52, respectively, the holes in one datum member being opposite and axially aligned with those in the other datum member. The datum members 42, 44 are illustrated as being constructed of plurality of relatively thin members which are assembled together, it being understood that each datum member can be a single element, but the thin members can be easily stamped, thus eliminating more expensive machining of the single members. An independently movable drive pin or meshing element 54 is located in each set of opposing openings or holes, the holes being larger than the cross-section of the pins 54 and limiting or restricting the rolling motion of the pins 54. Thus the datum members can be considered as movement limiting means, as holes 52, 54 limit the motion of meshing elements 54 when the system operates. The system is designed to insure a rolling motion of the meshing elements or pins 54 in the holes 50, 52. The outermost plates of the datum members act as stops for the pins 54 because the holes 50a and 50b are of smaller diameter than the holes 50, 52. The holes 50a and 50b permit the passage of lubricant to the pins.

Eccentric 56 is keyed by a key 57 to input shaft 18, and is surrounded by a motion producing device herein illustrated as a gear or sprocket 58 located between the datum members 42, 44. Gear 58 has teeth 60 separated by arcuate spaces 62 for engaging and subsequently disengaging drive pins 54 as the eccentric is rotated by the input shaft. The gear spaces 62 are each defined by a semi-circular surface (see especially FIG. 4a). The combination of round holes 50, 52, round pins 54 and semi-circular surfaced spaces 62 on the meshing gear insure pure rolling motion of the pins 54 in the holes 50, 52. As the gear engages the drive pins, the gear also rotates about its axis which is eccentric to the axis of the input shaft.

The number of drive pins 54 is at least one more than the number of gear teeth 60, which causes the gear to rotate at a speed which is less than that of input shaft, the speed ratio being expressed as $$n/(N-n)$$

where n equals the number of gear teeth and N equals the number of drive pins. A roller bearing assembly 64 is located between the eccentric 56 and the gear 58. The bearing 64 is retaoned by a bearing retainer 65 which comprises ring-like members at opposite sides of the bearing. The gear 58 is provided with spaced clearance holes 66 and alternate, smaller spaced holes 68, the holes 66 permitting the passage of the connecting rods 32 and the holes 68 each receiving a coupling pin 70. The coupling pins or motion producing means 70 are rotatably received in cup-like hardened bushings 72 and 74 in opposed openings 76 and 78 in the output shaft parts 24 and 26, respectively. The use of hardened bushings 72, 74 eliminates the necessity of hardening the output shaft assembly 26 without affecting the functioning of the above. The centers of holes 66 and 68 are on a circle which is concentric with respect to the gear 58.

To provide for smooth rotation of the input shaft 18, a counterweight assembly 80 is keyed by key 57 to the shaft 18 with portions on both sides of the eccentric 56. The ends of housing 12 can be dirt sealed by suitable sealing means identified at 82 and 84, the dirt seals being shown as double seals. The dirt seals are shown as being ring-like elastomeric members which wipe against the shaft, it being understood that other known types of dirt seals can be used if so desired. An inlet 90 and a drain 92 are provided to fill and drain the housing 12 with a lubricant, such as oil, as necessary. The inlet and drain are suitably closed by plugs, as illustrated. The dirt seals as illustrated also function to retain the lubricant in the housing.

In the embodiment illustrated, a one-way brake 94, is supported by the housing 12, and surrounds the output shaft member 29. Brake 94 is fixed in position by a set screw 96, as illustrated. The brake 94 overruns when the device is operational and prevents reverse rotation in the event of power loss which could result in damage to the assembly. Also, the brake protects the assembly from overload, if such occurs. In the event the device is to be used as a speed increaser instead of a speed reducer, shaft 18 would be connected as the output shaft, and output assembly 24, 26, 29 connected as the input shaft. In this case, one-way a brake 94 would be placed on the opposite end of the device, on shaft 18, and would operate in the same manner as explained above.

The arrangement just described can be constructed to be very compact. Additionally, all the load on the eccentric bearing is kept in a single plane.

Sections 24 and 26 of output shaft assembly 28 are supported by bearings 36 and 38 at locations which are spaced from each other. The support for output shaft assembly 28 is accomplished because of the connecting rods 32 which connect the sections 24 and 26 of the output shaft assembly 28. Rods 32 pass through holes 66 in gear 58 without interfering with the functions of the gear. By spacing the bearings supporting the output shaft assembly as shown, the load on the bearings is generally evenly distributed. The bearings also take any thrust loads on the shafts.

The drive pins 54 roll around the holes 50 and 52, which minimizes friction losses as contrasted to the use of prior art ovoid holes, in which sliding motion occurs. Round holes 50 and 52 in the capturing plates 42 and 44 and round teeth spaces 62 in the gear 58 are relatively simple to form, requiring no complex geometry or equations as do ovoid holes and tooth space geometry. The use of laminated capturing plates 42 and 44 simplifies their production, because the plates or laminates and the holes therethrough can easily be stamped in one operation from sheet metal.

OPERATION

As input shaft 18 is rotated, eccentric 56 is turned and the gear or sprocket 58 is forced to roll around while engaging drive pins 54, resulting in a slow speed rotation about its axis, as well as a high speed gyration around the shaft 18. The orbital motion of the gear is converted to rotary motion of output shaft assembly 28 by coupling pins 70 extending through holes 68. The coupling pins 70 transmit torque from gear 58 to the output shaft assembly 28, engaging assembly sections 24, 26. The diameter of each hole 48 is essentially equal to the diameter of coupling pins 70 plus the amount of eccentricity of gear 58 (caused by eccentric 56), to insure that the motion of the coupling pins is pure rolling motion, i.e., the pins 70 roll around the holes as the gear 58 gyrates. In this way, the rotation of the gear is transferred to the output shaft subassemblies while the gyration of the gear is not so transferred. The rolling motion of the pins in the holes results in a very high efficiency device, generally higher than that of conventional pin type couplings in which the pins slide around the hole diameter or within supporting bushings and the like, because frictional losses are minimized.

When used in the foregoing specification and the appended claims, the terms "semi-circular", and "round" mean that every point on the perimeter of the object or figure is equidistant from a fixed point at its center. The term "ovoid" means egg-shaped or oval, and especially a shape in which the basal end is broader than the other end.

We claim:

1. A speed reducer comprising:
   a rotatable input shaft;
   an output shaft assembly including an output shaft rotatable at a speed different from the speed of the input shaft, said output shaft and said input shaft being concentric with one another, said output shaft assembly including a cup-like part and two bearings, one supported by said cup-like part and another supported by another part of said bearing assembly, said input shaft being journalled in and supported by said bearings;
   an eccentric on said input shaft and rotatable therewith;
   a gear surrounding said eccentric and rotatable therewith, said gear being mounted to be freely rotatable with respect to said eccentric, and said gear having a plurality of teeth, the profiles of which are formed by semi-circular tooth spaces therebetween, said cup-like part of said output shaft assembly being positioned on one side of said gear, and said output assembly also including a sleeve-like part positioned on the other side of said gear, said sleeve-like part supporting said other bearing in which said input shaft is journalled, and a plurality of connecting rods passing through said gear to join said cup-like part and said sleeve-like part;
   at least one generally circular member, which is concentric with the axis of said input shaft and defines a plurality of equally spaced round openings in a circular array;
   a plurality of round drive pins, the number of said drive pins being at least one greater than the number of gear teeth, with each drive pin being supported in one of the openings in the circular member, each such opening being larger in diameter than the diameter of the supported drive pin to permit individual and independent captive rolling movement of said drive pin therein;
   said gear being so disposed that its teeth and tooth spaces sequentially and independently mesh said drive pins as the gear rotates with said eccentric;
   said meshing of said gear and drive pins causing said gear to rotate about said eccentric while being rotated with said eccentric;
   means connecting said gear to said output shaft assembly, such that its rotation with and about said eccentric rotates said output shaft, said means connecting said gear to said output shaft assembly comprising coupling pins passing through said gear and journalled in said output shaft assembly parts; and
   a one-way brake surrounding said output shaft and permitting said output shaft to rotate in one direction.

2. A motion transmitting system as recited in claim 1, including a second generally circular member spaced from said one generally circular member, each of which circular members is constructed of a plurality of relatively thin plate-like parts, and each circular member defining a plurality of said equally spaced round openings, each opening in one member being axially aligned with an opening in the other member.

* * * * *

UNITED STATES PATENT AND TRADEMARK OFFICE
CERTIFICATE OF CORRECTION

PATENT NO. : 4,471,672
DATED : September 18, 1984
INVENTOR(S) : Roger P. Butterfield and Charles M. Allaben, Jr.

It is certified that error appears in the above-identified patent and that said Letters Patent are hereby corrected as shown below:

Column 4, line 13, "retaoned" should be "retained"

Column 4, line 52, "a break" should be "brake"

Column 5, line 24, "hole 48" should be "hole 68"

Signed and Sealed this

Ninth Day of April 1985

[SEAL]

Attest:

DONALD J. QUIGG

Attesting Officer       Acting Commissioner of Patents and Trademarks